US006818814B2

(12) United States Patent
Park

(10) Patent No.: US 6,818,814 B2

(45) Date of Patent: Nov. 16, 2004

(54) BRIDGE FOR GUITARS

(75) Inventor: In-Jae Park, Gyeonggi-do (KR)

(73) Assignee: Sungeum Music Co., Ltd. (KR)

( * ) Notice: Subject to any disclaimer, the term of this patent is extended or adjusted under 35 U.S.C. 154(b) by 58 days.

(21) Appl. No.: 10/353,872

(22) Filed: Jan. 29, 2003

(65) Prior Publication Data

US 2004/0144232 A1 Jul. 29, 2004

(51) Int. Cl.7 .................................................. G01D 3/04

(52) U.S. Cl. ............................ 84/298; 84/299; 84/307; 84/297 R

(58) Field of Search .......................... 84/298, 299, 307, 84/297 R

(56) References Cited

U.S. PATENT DOCUMENTS

| | | | | | |
|---|---|---|---|---|---|
| 455,221 | A | * | 6/1891 | Lorang | 84/298 |
| 1,190,929 | A | * | 7/1916 | Marx | 84/307 |
| 2,029,135 | A | * | 1/1936 | Stanley et al. | 84/298 |
| 4,202,240 | A | * | 5/1980 | Smith | 84/297 R |
| 4,768,414 | A | * | 9/1988 | Wheelwright | 84/298 |

* cited by examiner

*Primary Examiner*—Shih-Yung Hsieh

(74) *Attorney, Agent, or Firm*—R W Becker & Associates; Robert W. Becker

(57) ABSTRACT

A guitar bridge is provided which is mounted on a sounding board of a guitar body. In the bridge, a saddle-mounting region, on which a saddle for seating the guitar strings thereon is mounted, is formed to be thicker than the other portions around the saddle-mounting region. By lowering the height of the surrounding portions of the saddle-mounting region, the natural vibration of the sounding board of the guitar body is not impeded and simultaneously the guitar sound is improved owing to close adherence of the guitar strings to the saddle. The height of the bridge can be easily lowered when necessary because the interval between the guitar strings and the outer face of the neck has been widened because of use of the guitar for a long time, thereby causing trouble in playing the guitar. The external appearance of the guitar is visually improved because the guitar bridge is formed in three dimensions, and horizontal movement of the guitar strings on the bridge is prevented.

4 Claims, 3 Drawing Sheets

BRIDGE FOR GUITARS

BACKGROUND OF THE INVENTION

1. Field of the Invention

The present invention relates, in general, to a bridge for guitars, which is mounted on a guitar body and to which one end of guitar strings are fixed and, more particularly, to a bridge for guitars wherein a saddle-mounting region is constructed to be thicker than the other regions, thereby extending a sounding width and a sounding time of the guitar body, and generating a superior guitar sound. In addition, where it becomes difficult for a player to press the guitar strings with his/her fingers because the interval between the guitar strings and a neck is widened as a result of using the guitar for a long time, the interval between the guitar strings and the neck can be narrowed simply by shaving the region on which the saddle is mounted. Moreover, the bridge can be formed in three dimensions, thus improving the external appearance of the guitar. Further, the guitar sound will resonant better because the adherence of the guitar strings to the saddle is strengthened.

2. Description of the Prior Art

As well known to those skilled in the art, with regard to a guitar as shown in FIG. 1, one end of each of the guitar strings 3 is fixed to a guitar bridge 2 mounted on a guitar body 1, and the other end of each of the guitar strings 3 is adjustably mounted to a tuning device 4*a* of a guitar head 4.

As shown in FIG. 2, the guitar bridge 2 is attached to a sounding board 1*a* of the guitar body 1, to which a saddle 5 is mounted, and the guitar strings 3 are seated on the saddle 5. The ends of the guitar strings 3 are inserted into respective pin holes on the bridge 2, and then fixed by respective bridge pins 6.

However, the conventional bridge 2 as illustrated in FIG. 2 has demonstrated the following problems because the whole top face thereof is flat.

First, since the entire region of the guitar bridge 2 has to be thick, the sounding board 1*a* of the guitar body 1 has a weak flexibility, for which the sounding width and the sounding time of the guitar body 1 is shortened, and thus, the sound resonance in the guitar body 1 is degraded. Where the guitar has been used for a long time, the neck 7 and the sounding board 1*a* have been deformed because the timber of which the guitar is made has become too dry. Due to this deformation, the interval between the guitar strings 3 and the neck 7 is widened, thereby making it inconvenient for the player to press the guitar strings 3 with his/her fingers while playing the guitar. In this case, the top face of the bridge 2 has to be cut entirely or otherwise the bridge 2 has to be replaced with a new one, requiring a troublesome operation.

In addition, since the top face of the conventional bridge 2 is designed in two dimensions, it does not carry an agreeable external appearance.

Further, in a case of using the conventional bridge 2, since the portion on which the saddle 5 is installed is identical in height to the portion on which the bridge pins 6 are installed, as shown in FIG. 2, the angle of the guitar strings 3 when the guitar strings 3 are bent at the saddle 5 is not sufficient. Thus, since the strings 3 are not closely adhered to the saddle 5, the sounding width and the sounding time are shortened, whereby a poor quality of sound is generated from the guitar.

SUMMARY OF THE INVENTION

Accordingly, the present invention has been made keeping in mind the above problems occurring in the prior art, and an object of the present invention is to provide a bridge for guitars, with which a vibration of the sounding board of the guitar body is not impeded and simultaneously the guitar sound is improved by enlarging the close adherence of the strings to the saddle, the bridge can be easily lowered in height where the bridge needs to be lowered because the interval between the guitar strings and the external face of the neck has been widened, resulting from use of the guitar for a long time, which will cause a trouble in playing the guitar, and the external appearance of the guitar can be visually improved because the guitar bridge is formed in three dimensions.

In a bridge for guitars according to the present invention to accomplish the above object, the saddle-mounting region on which the saddle is mounted is higher in height than the other portions around the saddle-mounting region.

BRIEF DESCRIPTION OF THE DRAWINGS

The above and other objects, features and other advantages of the present invention will be more clearly understood from the following detailed description taken in conjunction with the accompanying schematic drawings, in which.

DETAILED DESCRIPTION OF THE INVENTION

Figure 1:
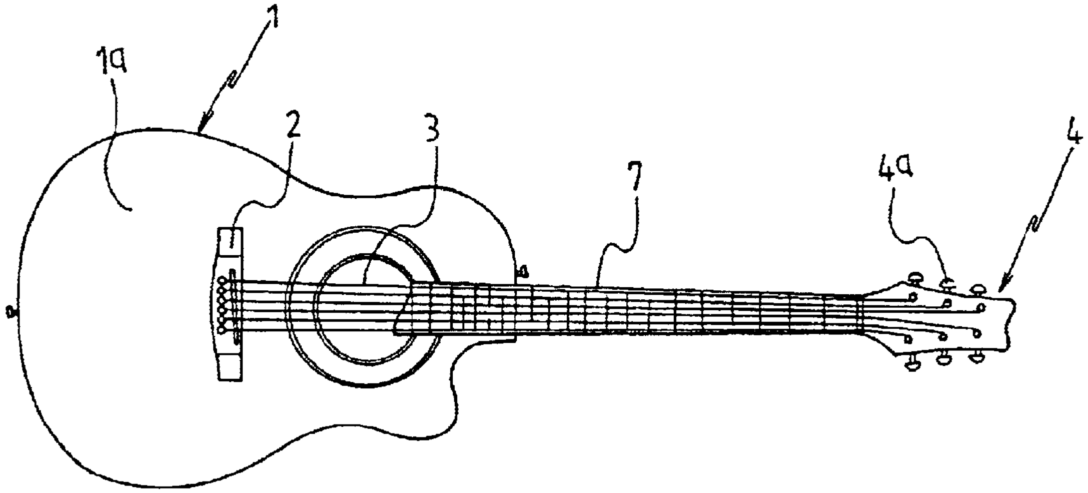
FIG. 1 PRIOR ART
FIG. 1 is a front view of a conventional guitar.
Figure 2:
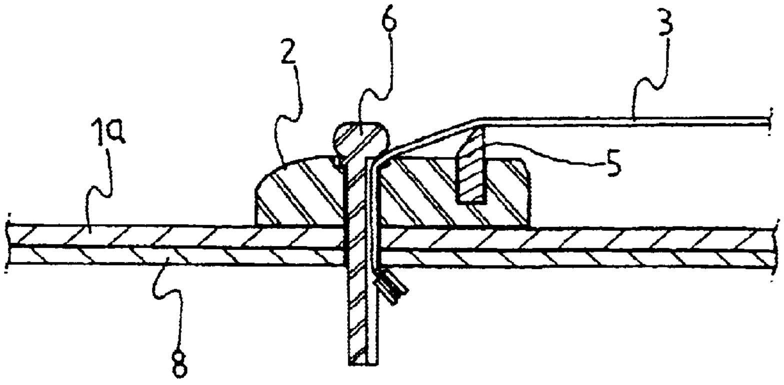
FIG. 2 PRIOR ART
FIG. 2 is a side sectional view of a conventional bridge installed on a guitar.

Reference should now be made to the drawings, in which the same reference numerals are used throughout the different drawings to designate the same or similar components.

Figure 3:
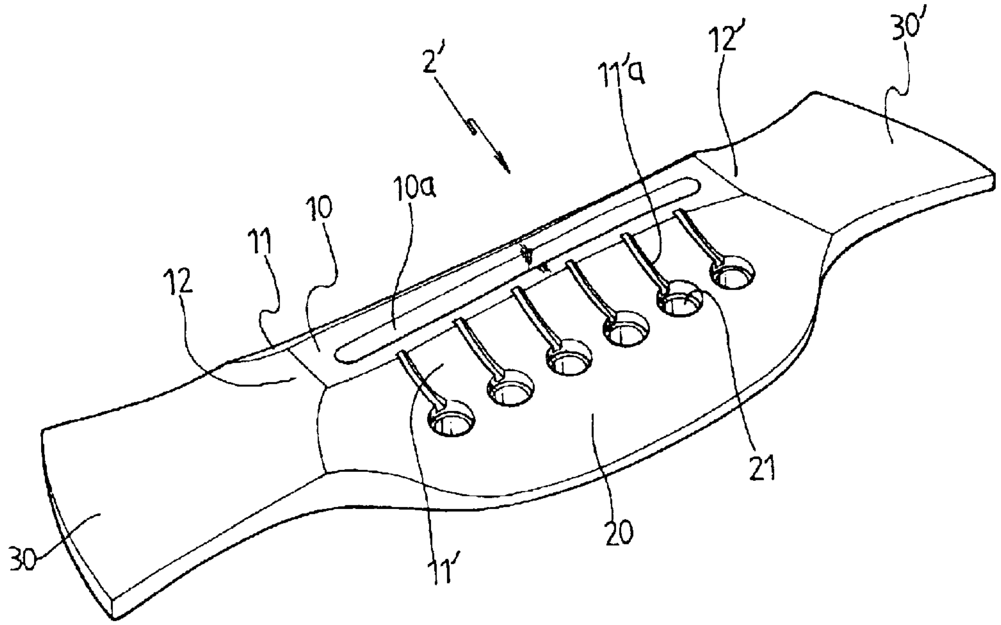
FIG. 3 is a perspective view of a bridge according to the present invention.
Figure 4:
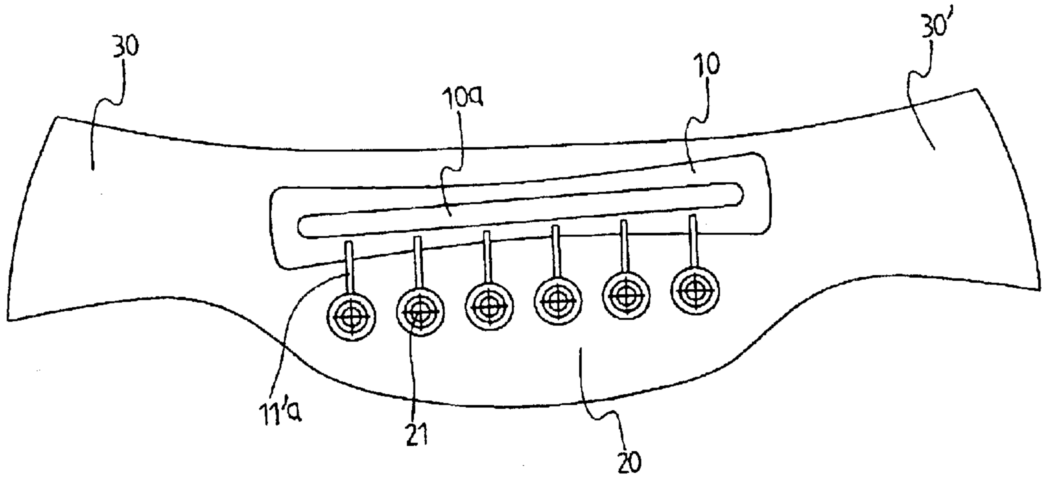
FIG. 4 is a top plan view of the bridge according to the present invention.
Figure 5:
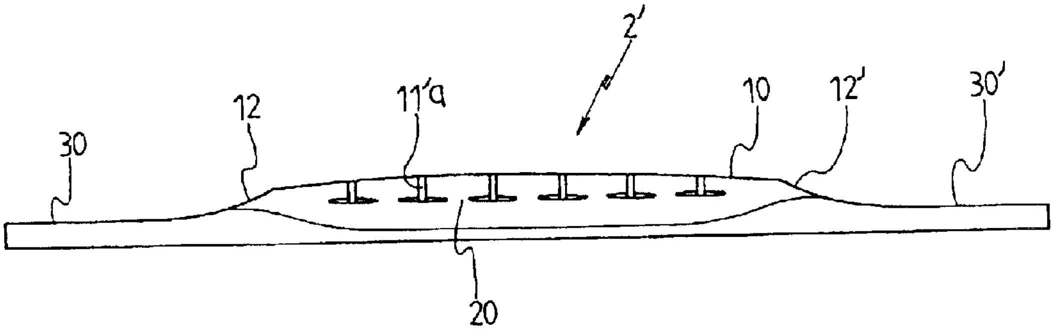
FIG. 5 is a front view of the bridge according to the present invention.
Figure 6:
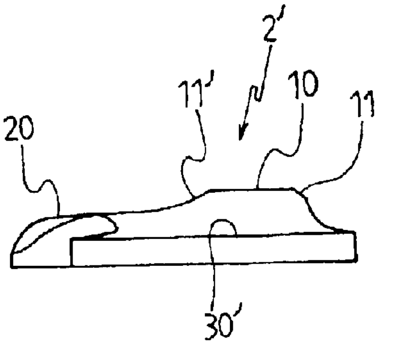
FIG. 6 is a side view of the bridge according to the present invention.
Figure 7:
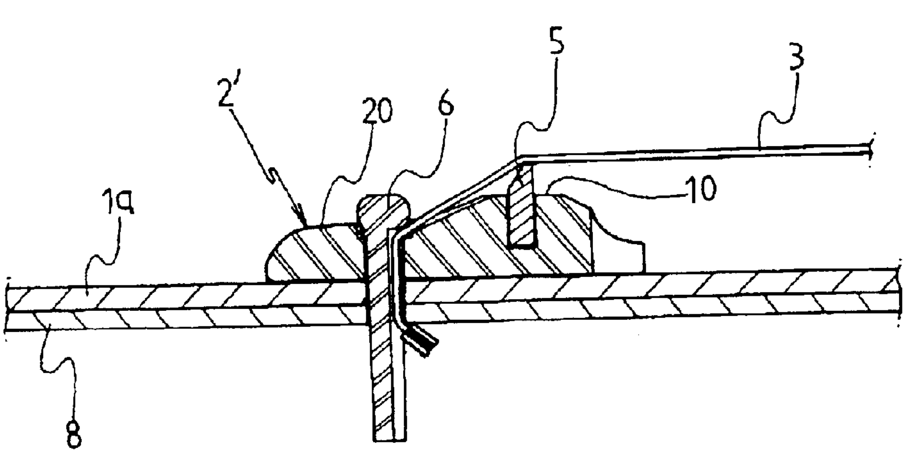
FIG. 7 is a side sectional view of the bridge according to the present invention, installed on a guitar.

FIG. 3 is a perspective view of a bridge according to the present invention. FIG. 4 is a top plan view of the bridge. FIG. 5 is a front view of the bridge. FIG. 6 is a side view of the bridge. FIG. 7 is a side sectional view of the bridge installed on a guitar.

As shown in the drawings, in a guitar bridge 2' according to the present invention, a saddle-mounting region 10, on which a saddle 5 seating a plurality of guitar strings 3 thereon is mounted, is formed to be thicker than the other portions around the saddle-mounting region 10. The top face of the saddle-mounting region 10 is flat but the portions 11, 11', 12 and 12' adjacent to the edges of the saddle-mounting region 10 are inclined. On the adjacent portion 11' on the pin hole portion 20 around the saddle-mounting region 10 are formed a plurality of slits 11'*a* for holding guitar strings 3 at positions corresponding to the respective pin holes 21.

The surrounding portions of the saddle-mounting region 10, that is, the pin hole portion 20 on which the pin holes 21 are formed and both sides 30 and 30', are formed to be thinner than the saddle-mounting region 10.

As shown in FIG. 7, the bridge 2' is attached to the sounding board 1*a* of the guitar body 1, and a reinforcing plate 8 is attached to an inner surface of the sounding board 1*a*. The saddle 5 is inserted into a groove 10*a* on the saddle-mounting region 10, and one end of each guitar string 3 is fixed with a bridge pin 6 inserted into a pin hole 21 after the string 3 is inserted into the pin hole 21.

In the guitar bridge 2' according to the present invention with this configuration, only the saddle-mounting region 10 is formed to be thick, making it more flexible than the conventional bridge 2 which is entirely thick, and thus, the sounding board 1*a* of the guitar body 1 is vibrated naturally. Also, the sound resonance in the guitar body 1 is improved because the sounding width and the sounding time of the guitar sound are extended.

After the guitar has been used for a long time, the timber of which the guitar is made dries out, and the neck 7 and the sounding board 1*a* have been deformed accordingly. Due to this deformation, the interval between the guitar strings 3 and the neck 7 is widened, making it inconvenient for a player to press the guitar strings 3 with his/her fingers. In this case, the guitar strings 3 and the saddle 5 are detached from the saddle-mounting region 10, and the external surface of the saddle-mounting region 10 is shaved so as to lower the height thereof. Then, the interval between the guitar strings 3 and the neck 7 is narrowed. This operation is simpler than to shave the entire top face of the bridge as in the conventional art.

In addition, the top face of the bridge 2' according to the present invention is formed in three dimensions owing to the saddle-mounting region 10 being thicker than the other portions around the saddle-mounting region 10, thereby carrying a more agreeable external appearance.

In the bridge 2' according to the present invention, since the pin hole portion 20 is in a lower position than the saddle-mounting region 10, as shown in FIG. 7, the angle of the guitar strings 3 when the guitar strings 3 are bent at the saddle 5 is enlarged. Thus, the close adherence of the guitar strings 3 to the saddle 5 is strengthened, serving to generate a fine sound from the guitar, and to extend the sounding width and the sounding time of the guitar sound.

According to the present invention, since the slits 11'*a* for holding the guitar strings 3 corresponding to the pin holes 21 are formed on the adjacent portion 11' on the pin hole portion 20 around the saddle-mounting region 10, the guitar strings 3 are firmly fixed, thereby preventing horizontal movement thereof.

As described above, the present invention provides a bridge for guitars with which natural vibration of the sounding board of the guitar body is not impeded and simultaneously the guitar sound is improved owing to the close adherence of the guitar strings to the saddle. The height of the bridge can be easily lowered where the height of the bridge needs to be lowered because the interval between the guitar strings and the outer face of the neck has been widened because of use of the guitar for a long time, thereby causing trouble in playing the guitar. The external appearance of the guitar is visually improved because the guitar bridge is formed in three dimensions, and horizontal movement of the guitar strings on the bridge is prevented.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

I claim:

1. A guitar bridge for mounting on a sounding board of a guitar body, said bridge comprising:

a saddle-mounting region;

a saddle mounted on said saddle-mounting region and serving for seating a plurality of guitar strings on said saddle; and regions disposed around said saddle-mounting region, wherein said saddle-mounting region is thicker than said regions disposed around said saddle-mounting region.

2. A guitar bridge according to claim 1, wherein said saddle-mounting region has a flat top face, and wherein said regions are inclined relative to said saddle-mounting region.

3. A guitar bridge according to claim 2, wherein said bridge is provided with pin holes, wherein one of said regions disposed around said saddle-mounting region that is adjacent to said pin holes is provided with a plurality of slits a for holding guitar strings, and wherein respective ones of said slits communicate with respective ones of said pin holes.

4. A guitar bridge according to claim 1, wherein said bridge is provided with pin holes, wherein one of said regions disposed around said saddle-mounting region that is adjacent to said pin holes is provided with a plurality of slits for holding guitar strings, and wherein respective ones of said slits communicate with respective ones of said pin holes.

* * * * *